United States Patent [19]

St. Onge

[11] Patent Number: 4,692,231

[45] Date of Patent: Sep. 8, 1987

[54] APPARATUS FOR CATHODIC PROTECTION OF METAL PIPING

[76] Inventor: Henri S. St. Onge, 75 Nugget Avenue, Scarborough, Ontario M1S 3B1, Canada

[21] Appl. No.: 698,908

[22] Filed: Feb. 6, 1985

[51] Int. Cl.$^4$ .............................................. C23F 13/00
[52] U.S. Cl. .................................. 204/197; 204/148; 285/231
[58] Field of Search ................. 204/148, 197; 285/231

[56] References Cited

U.S. PATENT DOCUMENTS

| 685,176 | 10/1901 | Ross | 204/197 |
|---|---|---|---|
| 1,646,736 | 10/1927 | Mills | 204/197 |
| 1,705,197 | 3/1929 | Mills | 204/197 |
| 2,802,781 | 8/1957 | Featherly | 204/197 |
| 2,810,690 | 10/1957 | Campise et al. | 204/197 |
| 2,887,446 | 5/1959 | Marx | 204/197 |
| 2,947,680 | 8/1960 | Preiser | 204/197 |
| 2,974,389 | 3/1961 | Tatum | 204/197 |
| 3,477,930 | 11/1969 | Crites | 204/197 |
| 3,574,080 | 4/1971 | Jones et al. | 204/197 |
| 3,616,421 | 10/1971 | Mackintosh | 204/197 |
| 4,045,320 | 8/1977 | Klingenberg | 204/197 |
| 4,146,448 | 3/1979 | Nakano et al. | 204/197 |

Primary Examiner—T. Tung

[57] ABSTRACT

According to the present invention a cathodic protection system for metal piping systems and fittings, therefore, is possible which is easy to install and manufacture. The system for fitting uses a unique sacrificial washer or sacrificial nut installed on the bolts used to fasten the fitting and includes a nonsacrificing portion to maintain the mechanical connection during and after depletion of the sacrificing metal. A unique ring anode is also taught which is secured to the bellmouth of a section of pipe to provide an extension thereof which can be factory or field installed. Preferably each anode is designed to protect two connected pipe sections or a pipe section and fitting.

10 Claims, 10 Drawing Figures

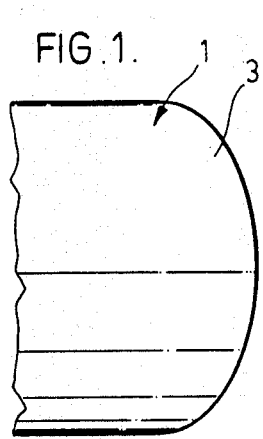
FIG. 1.
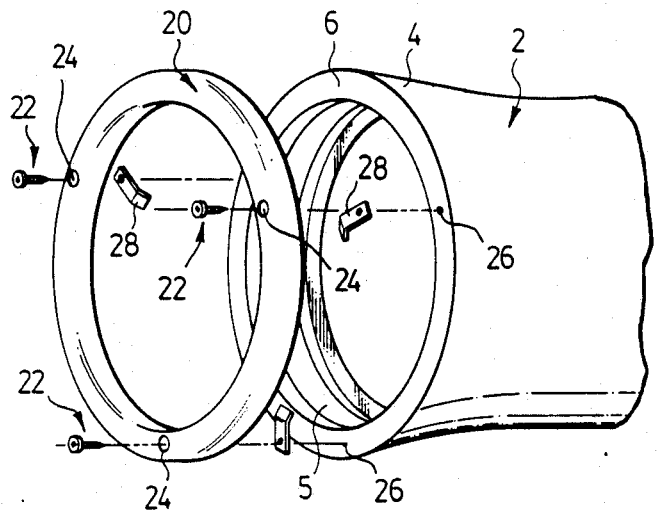
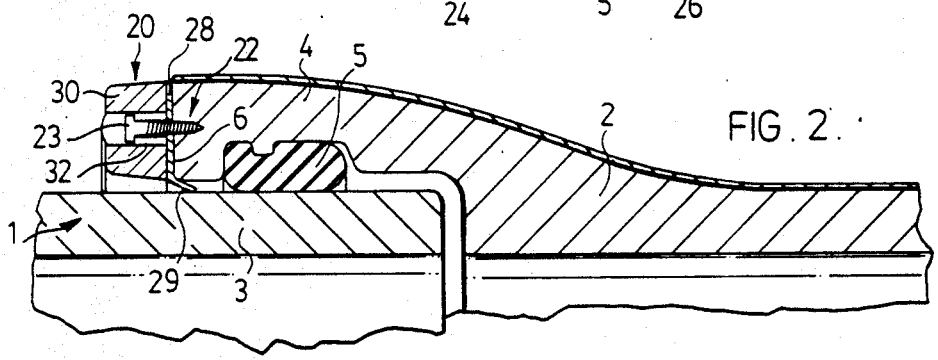
FIG. 2.
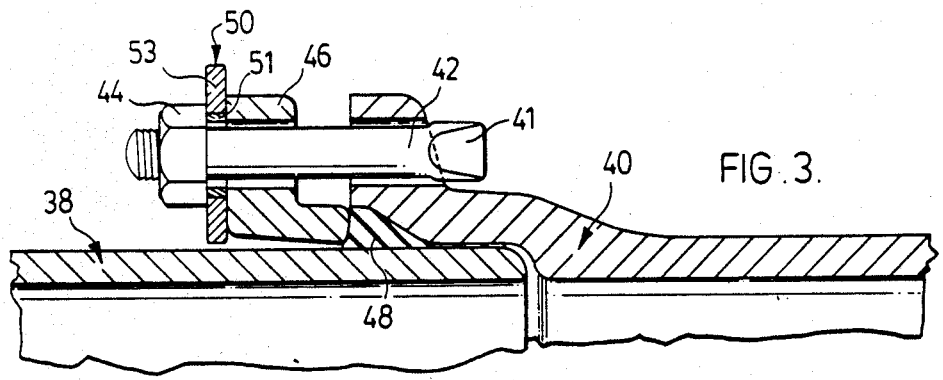
FIG. 3.
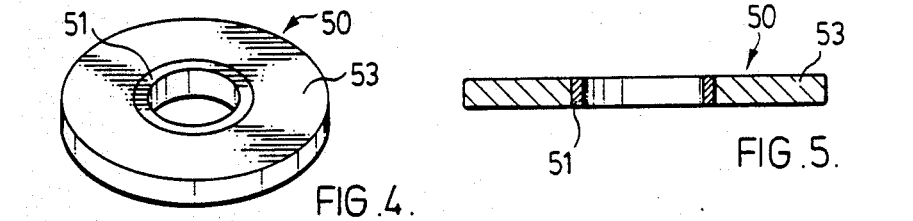
FIG. 4.
FIG. 5.

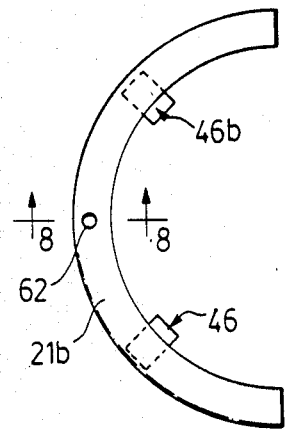
FIG. 6.
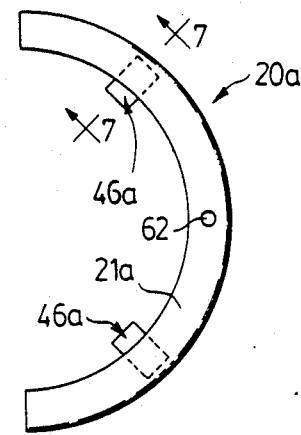
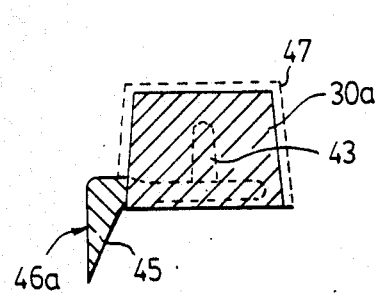
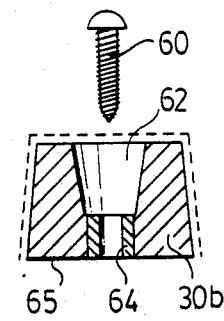
FIG. 7.
FIG. 8

APPARATUS FOR CATHODIC PROTECTION OF METAL PIPING

BACKGROUND OF THE INVENTION

The present invention relates to cathodic protection of iron piping systems and the fittings therefor for use in aggressive soil environments. In particular, the invention relates to a simple system for adding sacrificial metal anodes to such systems and fittings.

Corrosion protection of iron piping systems and metal tanks by means of sacrificial anodes is well known. The most common practice places sacrificial anodes along side the tank or pipe line and electrically connects the anodes thereto. Because of the different metal of the pipe line and the sacrificial anodes, the anodes are sacrificed and will protect the pipe line or tank against corrosion until the anodes have been depleted. These systems work satisfactorily, however they do require care and skill in installation. Therefore there still remains a need for a cathodic protection system for ductile iron piping and the like which is simple and can be installed with relatively unskilled labour.

Other examples of known cathodic protection for various applications are exemplified in U.S. Pat. No. 2,974,389 Tatum which discloses a metal casket having sacrificial anodes attached thereto, U.S. Pat. No. 3,574,080 Jones et al which discloses a unique screw fastener having a portion thereof of sacrificial metal and U.S. Pat. No. 1,646,736 Mills which discloses a combination pipe connector and sacrificial metal anode.

The above listed patents are examples of more complicated structures which although installation of the cathodic protection is simplified, the manufacturing cost of the various structures disclosed is greatly increased. Therefore, the ease of installation must be accomplished while still providing a structure for a sacrificial anode which is easily manufactured. Furthermore, sacrificial anodes if used in a fitting must be such that the securement of the fitting to the pipe lines remains intact even after the sacrificial anode has been depleted.

The present invention provides a corrosion protection system for ductile iron sectional buried piping systems which is easily installed while providing a structure which can be manufactured at low cost. The sacrificial anode may be secured to individual lengths of piping prior to installation in the system, or the anodes can be secured during the installation thereof. There is no requirement for skilled expertise during the installation and the anode can be connected in a manner to protect a number of sections of pipe simultaneously.

SUMMARY OF THE INVENTION

According to the present invention, a unique ring anode is discussed for use in a corrosion protection system for ductile iron sectional buried piping systems. The anode comprises a sacrificial metal, a nonsacrificial metal embedded in the sacrificial metal which has a bore for the passage of a structural member therethrough for mechanically securing of the anode to a section of the piping system, means for making electrical contact with the adjacent section of the piping system is provided whereby each section is at least partially protected by one annode. Such an anode is particularly suitable for use in piping systems having a bellmouth and spigot type connection between adjacent pipe sections and the ring anode is directly secured to the bellmouth of a pipe section to provide an extension thereof extending generally in the length of the pipe section. The mechanical securement of the anode is provided through the nonsacrificial metal which directly contacts the bellmouth connection and as such is not effected when the sacrificial metal has been depleted.

In an associated form of the invention, the anode is made in the form of a washer or nut having an interior steel portion with sacrificial high grade zinc exterior to the steel portion. Such sacrificial washers and nuts can easily be secured on the bolt type connections used to secure fittings on pipe lines with the bolt providing the electrical contact between the two sections of pipe. In this way the sacrificial washer and nut protect both sections of pipe. Such an arrangement is suitable for fire hydrant and mechanical joints for connection to water piping systems where a plurality of bolts are spaced about the fire hydrant joint and sacrificial washers and/or nuts can be placed on each of the bolts as a simple method for providing cathodic protection for the hydrant and the associated length of piping.

In another form of the invention, a ring type anode is provided with a plurality of steel type sleeves inset in the ring anode spaced about the circumference of the anode for securing of the ring anode to the bellmouth of a pipe section. The sleeve provides the bore for allowing passage of a securing member to attach the ring anode to the bellmouth.

BRIEF DESCRIPTION OF THE DRAWINGS

Preferred embodiment of the invention are shown in the drawings wherein:

FIG. 1 is a partial exploded view of a bellmouth spigot connection between two sections of pipe with a ring anode about to be secured to the bellmouth of one of the sections;

FIG. 2 is a partial sectional view through a ring anode secured to the bellmouth of a pipe section;

FIG. 3 is a partial sectional view through a mechanically secured pipe section having a bolt and wedge type connection with a washer to one side of the bolt connection to provide cathodic protection;

FIG. 4 is a perspective view of a washer annode;

FIG. 5 is a sectional view through the washer anode of FIG. 4;

FIG. 6 is a top view of a split ring anode;

FIG. 7 is a section through line 7—7 of FIG. 6;

FIG. 8 is a section through line 8—8 of FIG. 6;

DETAILED DESCRIPTION OF THE PREFERRED EMBODIMENTS

Figure 9:
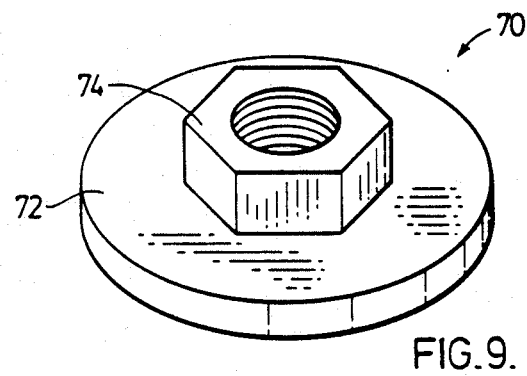
FIG. 9 is a perspective view of an alternate structure where the sacrificial metal is secured to a nut.

As shown in FIG. 1, two sections of pipe 1 and 2 are shown with pipe section 1 having a spigot type connection 3 for insertion within the bellmouth connector 4 of pipe section 2. The bellmouth 4 has been provided with a flat surface annulus 6 to which the ring anode 20 is to be secured and in abutment therewith. The ring anode 20 has a generally flat surface for contact with the flat surface of annulus 6 of the bellmouth 4 and positive contact between the ring anode 20 and annulus 6 is provided by mechanical securement of the anode to the annulus through screw pins 22 which pass through bores 24 in the ring anode 20 and engage within the recesses 26 provided in annulus 6. In addition, and in order to provide electrical continuity between pipe section 1 and section 2, electrically conducting bracket members 28 are provided through which the connectors 22 pass and these brackets 28 provide electrical communication between the bellmouth connector of pipe section 2 and the spigot connection 3 of pipe section 1. Details of this electrical connection can be appreciated from FIG. 2.

Turning to FIG. 2, it can be seen that the ring anode 20 has a sacrificial metal portion 30 preferably of a high grade zinc conforming to ASTM B418-73. Embedded in the sacrificial metal and within each of the bores 24 is a sleeve 32 which is of a nonsacrificing metal relative to the ductile iron pipe sections 1 and 2. The screw type mechanical fastener 22 includes a head 23 which is in contact with one surface of the metal sleeve 32 which is in direct contact with the bracket 28. Bracket 28, on the opposite side of sleeve 32 is in direct contact with annulus 6 of the bellmouth 4. Therefore, the bracket 28 which is electrically conductive is in direct contact with annulus 6 and is in contact with the sleeve 32. Furthermore, the screw fastener 22 is in contact with the sleeve and the bellmouth of pipe section 2 thereby providing a further electrical conducting path as the screw fastener 22 is made of a electrically conductive material. The bracket 28 includes a bent end portion 29 for engaging the exterior surface of the spigot 3 of pipe section 1. Therefore the ring anode 20 is now in electrical contact with bellmouth 4 and spigot 3, thereby providing cathodic protection to both sections of pipe 1 and 2. The seal between spigot 3 and bellmouth 4 is partially provided by the compressible seal member 5 shown trapped between the exterior surface of the spigot 3 and the interior surface of the bellmouth 4. An example of this type of connection is sold in the trade as a "*Tyton Joint".

*Trade Mark

A slightly different cathodic protection arrangement is shown in FIG. 3 and is suitable for use in protecting fittings which are secured to pipe sections. In this case, a fitting having a stem 40 is secured to the pipe section 38 by means of a plurality of bolts one of which is shown as 42. This bolt 42 in combination with nut 44 and wedge member 46 and seal 48 provides a simple means for sealing the stem 40 and pipe section 38. By tightening the nut 44, wedge member 46 is driven between the pipe sections and compresses seal 48 to positively maintain the connection between the stem 40 and section 38. In order to provide cathodic protection for at least the fitting of stem 40, an anode washer 50 is secure to each of the bolts 42 intermediate the bolt head 41 and nut 44. As the washer is part of the mechanical connection maintaining the stem 40 connected to section 38, an interior steel nonsacrificing ring collar 51 is provided which will remain intact even when the sacrificial metal portion 53 has been depleted. The bolt 42 provides electrical contact with the anode washer 50 and stem 40 and if desired, wedge member 46 can be such that it establishes electrical contact with pipe section 38 whereby the washer will also serve to protect this pipe section.

As shown in FIGS. 4 and 5, steel collar 51 of the washer anode 50 is centrally located and provides a bore through which bolt member 42 can pass. Collar 51 is the same thickness as ring anode 50 and as such is in contact with the nut 44 and wedge member 46. Collar 51 of the washer anode provides part of the mechanical connection and will remain uneffected after the depletion of the sacrificial metal 53 preferably of high grade zinc.

The ring anode 20 and the sacrificial anode washer 50 can be manufactured independently of the parts to which they are to be applied and are easily installed during installation of the piping system. The ring anode 20 could be secured to sections of pipe prior to shipping the pipe sections to site or may be installed as the sections are laid. Both anodes are of a structure easily manufactured and conveniently installed as required. Furthermore, there is no need to change any of the remaining components of the piping system in the event that corrosion protection is not required. The ring anode 20 merely provides an extension of the bellmouth and does not form part of the securement of pipe sections. In the case of the washer anode of FIGS. 3 through 5, the nut would merely be threaded on the bolt a further distance or probably a normal washer would be substituted in its place.

The electron output of the anode can be increased if it is coated with a low resistant depolarizing activator material and this will result in improved operation of the system. This coating, preferably a gypsum base coating containing sodium sulphate and bentonites, allows the zinc to remain active in all kinds of soil environment subject to low to high current requirement. In this case, electrical contact is maintained due to the nonsacrificial portions 51 and 32 of the washer and ring anode respectively, remaining in electrical contact via the mechanical securement of the components. Preferrably, the pipe sections are coated with a protective dielectric coating to provide a barrier to electron flow to the soil thereby further increasing the life of the annode and its protective capabilities. Suitable pipe coatings include polyethylene, epoxy, urethane or polymeric type coatings. Such coatings act as a barrier against an aggressive environment, however during installation scratches in the coating inevitably occur and the ring anode or washer will serve to protect the exposed sections which are subject to the corrosive environment. The ring anode effectively protects the pipe sections by (a) providing an electron flow to the iron pipe to cause the iron pipe to become negatively charged and preferably negatively charged such that it has a negative voltage of at least about 700 and preferrably about 850 millivolts with reference to a copper/copper sulphate electrode or −300 millivolts more negative then the initial iron potential; (b) the negative charging of the pipe sections attracts positive soil ions and zinc ions to form a protective ionic barrier to the exterior of the piping (this effect is termed ionic shield); and (c) the dielectric coating restricts electrons and hydrogen ions from mating to form hydrogen gas. However, at coating flaws this mating does occur to plate out the would be corrosion of the iron pipe.

A split ring anode 20a having two halves 21a and 21b, is illustrated in FIGS. 6 through 8 and can be used as an alternative to the ring anode of FIG. 1. The split anode is suitable for securement of a bellmouth and spigot connection of pipe sections with nonsacrificing electrically conducting wedges 46a and 46b embedded in the sacrificial zinc 30a of the annode. The wedges 46a and 46b have a hardened tapered conductivity section 45 for contacting the bellmouth of one pipe section and the spigot of an associated section and include an anchoring portion 43 embedded centrally in the cast zinc. A depolarizing coating layer 47 is also provided about the zinc anode. In addition to the wedge connection, the split anodes are pinned to the bellmouth of a pipe section by drive screws 60 received in countersink cavities 62 within the sacrificial cast zinc split anodes 21a or 21b. A steel nonsacrificing steel insert 64 is provided within cavity 62 and a flat anode face 65 is provided for abutting contact with surface 6 of a bellmouth of a section of pipe. This split ring arrangement may be more convenient when installation is to be completed during pipe installation, whereas the full ring anode of FIG. 1 is more convenient for factory installed cathodic protection.

The washer anode is suitable for all mechanical fittings as the bolt sizes are normally standardized for a given system. For example in water piping systems, $\frac{5}{8}$ inch bolts are most common. Similarly, slip-on elbows, tees, valves etc. for a given piping system, have a standardized bellmouth and as such can easily receive a ring anode. Such an arrangement simplifies installation and eliminates the need for specialized corrosion protection anodes. In slip on connections the ring anode is used, whereas the washer anode is used on mechanical connections secured with bolts.

Figure 10:
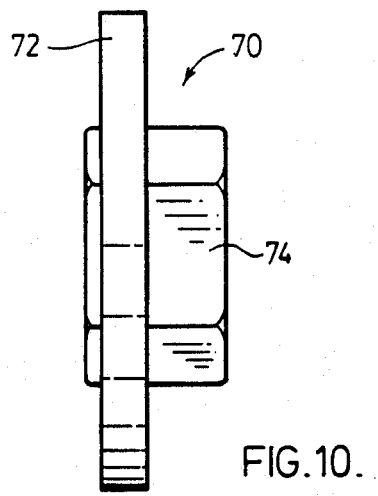
FIG. 10 is a side view of the sacrificial nut of FIG. 9.

The sacrificial nut 70 shown in FIGS. 9 and 10 has an outer ring 72 of high grade zinc and a zinc plated steel nut 74 preferably fusion bonded to the outer ring 72. The nut 74 forms part of the electrical path to the sacrificial outer ring 72 which is sacrificial to protect the piping system. The nut 74 projects well beyond the ring 72. This nut 70 would be used with a conventional washer to distribute securing force. The sacrificial nut could be used in place of the sacrificial washer described in the earlier figures.

Although various preferred embodiments of the present invention have been described herein in detail, it will be appreciated by those skilled in the art, that variations may be made thereto without departing from the spirit of the invention or the scope of the appended claims.

The embodiment of the invention in which an exclusive property or privilege is claimed are defined as follows:

1. A length of iron pipe for use in a piping system subject to corrosion, said iron pipe having a bellmouth connection at one end thereof and a spigot connection at the opposite end for insertion in the bellmouth connection of a similar length of pipe, said bellmouth having a flat annular surface about the end thereof to which a sacrificial ring anode is mechanically secured in a manner to be in electrical conduction with said iron pipe, said sacrificial ring anode being made of a high grade zinc and having a substantial area of contact with said flat annular surface, said flat annular surface and said ring anode being of essentially the same internal and external diameters.

2. A length of iron pipe as claimed in claim 1, wherein said sacrificial ring anode is coated with a low resistant depolarizing activator material.

3. In a ductile iron piping system as claimed in claim 1, wherein said ring anode is split and each split anode includes conducting wedges partially embedded therein for insertion between a bellmouth and spigot connection of pipe sections.

4. In a system as claimed in claim 3, wherein each conducting wedge includes an anchor portion generally centrally extending in said split anode.

5. In a ductile iron sectional buried piping system having bellmouth and spigot connections between adjacent lengths of pipe, the bellmouth end of each length of pipe having a flat annular flange surface at the end of and perpendicular to the length of the pipe, a corrosion protection system including a plurality of ring anodes each secured to the flat annular surface of the bellmouth end of a length of pipe, and each anode being of a size to provide an extension of said bellmouth generally consistent with the internal and external dimensions of said annular flange surface, each ring anode including a sacrificial metal and non-sacrificial metal portions embedded in said sacrificial metal, each non-sacrificial metal portion having a bore and an associated electrically conductive structural member received in said bore and engaging said flange surface to secure said anode to said pipe length in a manner providing electrical communication therebetween and maintaining said electrical communication with the depletion of said sacrificial metal.

6. In a system as claimed in claim 5, wherein said ring anode is at least partially coated with a depolarizing activator material on the surface of said anode.

7. In a system as claimed in claim 6, wherein said coating is gypsum base and contains sodium sulphate and bentonite.

8. In a system as claimed in claim 5, wherein each anode includes at least three nonsacrificial metal portions equally spaced about the circumference of the respective anode.

9. In a system as claimed in claim 8 including means for making electrical contact with an adjacent section comprising at least one electrically conducting means between the interior of said bellmouth and the exterior of an adjacent pipe section, said electrically conducting means including a portion being secured between said anode and the opposing face of said bellmouth and cooperating with one of said structural members such that said electrically conducting means maintains electrical contact with said bellmouth and the exterior of said adjacent pipe section.

10. In a system as claimed in claim 8, wherein said nonsacrificial metal is a steel sleeve in direct contact with said structural member and said sacrificial metal is a high grade zinc.

* * * * *